(12) United States Patent
Le et al.

(10) Patent No.: US 12,087,306 B1
(45) Date of Patent: Sep. 10, 2024

(54) CONTEXTUALIZED STREAMING END-TO-END SPEECH RECOGNITION WITH TRIE-BASED DEEP BIASING AND SHALLOW FUSION

(71) Applicant: Meta Platforms, Inc., Menlo Park, CA (US)

(72) Inventors: Duc Hoang Le, Sunnyvale, CA (US); FNU Mahaveer, Foster City, CA (US); Gil Keren, San Francisco, CA (US); Christian Fuegen, Kingston Upon Thames (GB); Yatharth Saraf, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 218 days.

(21) Appl. No.: 17/535,005

(22) Filed: Nov. 24, 2021

(51) Int. Cl.
*G10L 15/16* (2006.01)
*G10L 15/28* (2013.01)

(52) U.S. Cl.
CPC .............. *G10L 15/28* (2013.01); *G10L 15/16* (2013.01)

(58) Field of Classification Search
CPC .......................................... G10L 15/02–15/20
See application file for complete search history.

(56) References Cited

U.S. PATENT DOCUMENTS

| | | | |
|---|---|---|---|
| 11,610,584 B2* | 3/2023 | Lai | G06F 16/3329 |
| 11,657,799 B2* | 5/2023 | Zhao | G06N 3/044 |
| | | | 704/232 |
| 2020/0349923 A1* | 11/2020 | Hu | G10L 15/193 |
| 2020/0357387 A1* | 11/2020 | Prabhavalkar | G06N 3/045 |
| 2022/0301578 A1* | 9/2022 | Park | G10L 15/08 |
| 2022/0310067 A1* | 9/2022 | Huang | G06F 40/289 |

OTHER PUBLICATIONS

Chen Z., et al., "Joint Grapheme and Phoneme Embeddings for Contextual End-to-End ASR," Interspeech, 2019, 5 pages.
Graves A., "Sequence Transduction with Recurrent Neural Networks," International Conference of Machine Learning (ICML), arXiv preprint arXiv:1211.3711, Nov. 14, 2012, 9 pages.
(Continued)

*Primary Examiner* — Abul K Azad
(74) *Attorney, Agent, or Firm* — BakerHostetler (57) ABSTRACT

In one embodiment, a method includes receiving a user's utterance comprising a word in a custom vocabulary list of the user, generating a previous token to represent a previous audio portion of the utterance, and generating a current token to represent a current audio portion of the utterance by generating a bias embedding by using the previous token to query a trie of wordpieces representing the custom vocabulary list, generating first probabilities of respective first candidate tokens likely uttered in the current audio portion based on the bias embedding and the current audio portion, generating second probabilities of respective second candidate tokens likely uttered after the previous token based on the previous token and the bias embedding, and generating the current token to represent the current audio portion of the utterance based on the first probabilities of the first candidate tokens and the second probabilities of the second candidate tokens.

20 Claims, 6 Drawing Sheets

(56) References Cited

OTHER PUBLICATIONS

Gulati A., et al., "Conformer: Convolution-Augmented Transformer for Speech Recognition," Audio and Speech Processing, 2020, 5 pages.

Gulcehre C., et al., "On Using Monolingual Corpora in Neural Machine Translation," arXiv preprint arXiv:1503.03535, 2015, 9 pages.

He Y., et al., "Streaming End-to-End Speech Recognition for Mobile Devices," International Conference on Acoustics, Speech, and Signal Processing (ICASSP), 2019, 5 Pages.

Jain M., et al., "Contextual RNN-T for Open Domain ASR," Interspeech, 2020, 5 pages.

Kannan A., et al., "An Analysis of Incorporating an External Language Model Into a Sequence-to-Sequence Model," International Conference on Acoustics, Speech and Signal Processing (ICASSP), 2018, pp. 5824-5828.

Kim S., et al., "Improved Neural Language Model Fusion for Streaming Recurrent Neural Network Transducer," International Conference on Acoustics, Speech and Signal Processing (ICASSP), 2021, pp. 7333-7337.

Ko T., et al., "Audio Augmentation for Speech Recognition," Interspeech, 2015, pp. 3586-3589.

Kudo T., et al., "SentencePiece: A Simple and Language Independent Subword Tokenizer and Detokenizer for Neural Text Processing," Empirical Methods in Natural Language Processing, 2018, 6 pages.

Kudo T., "Subword Regularization: Improving Neural Network Translation Models with Multiple Subword Candidates," Association for Computational Linguistics (ACL), 2018, vol. 1, pp. 66-75.

Le D., et al., "Deep Shallow Fusion for RNN-T Personalization," IEEE Spoken Language Technology Workshop (SLT), 2021, 7 pages.

Le D., et al., "From Senones To Chenones: Tied Context-Dependent Graphemes for Hybrid Speech Recognition," Audio and Speech Processing, arXiv preprint arXiv:1910.01493, 2019, 8 pages.

Le D., et al., "G2G: TTS-Driven Pronunciation Learning for Graphemic Hybrid ASR," IEEE International Conference on Acoustics, Speech and Signal Processing (ICASSP), 2020, 5 pages.

Liu C., et al., "Improving RNN Transducer Based ASR with Auxiliary Tasks," IEEE Spoken Language Technology Workshop (SLT), 2021, pp. 172-179.

Mahadeokar J., et al., "Alignment Restricted Streaming Recurrent Neural Network Transducer," IEEE Spoken Language Technology Workshop (SLT), 2021, pp. 52-59.

McDermott E., et al., "A Density Ratio Approach to Language Model Fusion in End-to-End Automatic Speech Recognition," Automatic Speech Recognition and Understanding Workshop (ASRU), 2019, 8 pages.

Meng Z., et al., "Internal Language Model Estimation for Domain-Adaptive End-to-End Speech Recognition," Spoken anguage Technology Workshop (SLT), 2021, pp. 243-250.

Panayotov V., et al., "Librispeech: An ASR Corpus Based on Public Domain Audio Books," IEEE International Conference on Acoustics, Speech and Signal Processing (ICASSP) 2015, 5 pages.

Park D.S., et al., "Specaugment: A Simple Data Augmentation Method for Automatic Speech Recognition," in Proceedings of Interspeech, 2019,Sep. 15-19, 2019, 6 pages.

Prabhavalkar R., et al., "A Comparison of Sequence-to-Sequence Models for Speech Recognition," Interspeech, 2017, pp. 939-943.

Pundak G., et al., "Deep Context: End-to-End Contextual Speech Recognition," IEEE Spoken Language Technology Workshop (SLT), 2018, 8 pages.

Shan C., et al., "Component Fusion: Learning Replaceable Language Model Component for End-to-End Speech Recognition System," International Conference on Acoustics, Speech and Signal Processing (ICASSP), 2019, 5 pages.

Shi Y., et al., "Emformer: Efficient Memory Transformer Based Acoustic Model for Low Latency Streaming Speech Recognition," IEEE International Conference on Acoustics, Speech and Signal Processing (ICASSP), 2021, pp. 6783-6787.

Sriram A., et al., "Cold Fusion: Training Seq2Seq Models Together with Language Models," Interspeech, 2018, pp. 387-391.

Toshniwal S., et al., "A Comparison of Techniques for Language Model Integration in Encoder-Decoder Speech Recognition," Spoken Language Technology Workshop (SLT), 2018, pp. 369-375.

Variani E., et al., "Hybrid Autoregressive Transducer (HAT)," International Conference on Acoustics, Speech and Signal Processing (ICASSP), 2020, pp. 6139-6143.

Zhang X., et al., "Benchmarking LF-MMI, CTC and RNN-T Criteria for Streaming ASR," Spoken Language Technology Workshop (SLT), 2021, pp. 46-51.

Zhao D., et al., "Shallow-Fusion End-to-End Contextual Biasing," Interspeech, 2019, pp. 1418-1422.

\* cited by examiner

CONTEXTUALIZED STREAMING END-TO-END SPEECH RECOGNITION WITH TRIE-BASED DEEP BIASING AND SHALLOW FUSION

TECHNICAL FIELD

This disclosure generally relates to speech recognition, and in particular relates to speech recognition based on machine learning.

BACKGROUND

Speech recognition is an interdisciplinary subfield of computer science and computational linguistics that develops methodologies and technologies that enable the recognition and translation of spoken language into text by computers. It is also known as automatic speech recognition (ASR), computer speech recognition or speech to text (STT). It incorporates knowledge and research in the computer science, linguistics and computer engineering fields. Some speech recognition systems require "training" where an individual speaker reads text or isolated vocabulary into the system. The system analyzes the person's specific voice and uses it to fine-tune the recognition of that person's speech, resulting in increased accuracy. Speech recognition applications include voice user interfaces such as voice dialing (e.g. "call home"), call routing (e.g. "I would like to make a collect call"), appliance control, search key words (e.g. find a podcast where particular words were spoken), simple data entry (e.g., entering a credit card number), preparation of structured documents (e.g. a radiology report), determining speaker characteristics, speech-to-text processing (e.g., word processors or emails), and aircraft (usually termed direct voice input). From the technology perspective, speech recognition has a long history with several waves of major innovations. Most recently, the field has benefited from advances in deep learning and big data. The advances are evidenced by the worldwide industry adoption of a variety of deep learning methods in designing and deploying speech recognition systems.

Machine learning (IL) is the study of computer algorithms that improve automatically through experience and by the use of data. It is seen as a part of artificial intelligence. Machine learning algorithms build a model based on sample data, known as "training data", in order to make predictions or decisions without being explicitly programmed to do so. Machine learning algorithms are used in a wide variety of applications, such as in medicine, email filtering, speech recognition, and computer vision, where it is difficult or unfeasible to develop conventional algorithms to perform the needed tasks.

SUMMARY OF PARTICULAR EMBODIMENTS

In particular embodiments, a computing system may use an improved automatic speech recognition (ASR) model for more accurate prediction of custom vocabularies at runtime by integrating shallow fusion, trie-based deep biasing, and neural network language model contextualization. The improved ASR model may generalize well to different scenarios without the need to be trained for every user. The improved ASR model may be based on three components, i.e., a trie-based deep biasing module, a transducer, and a language model. In particular, the trie-based deep biasing module may be based on a prefix trie that may be built from a list of custom vocabularies associated with a user, which may be personal to that user. The transducer and the language model may be based on neural networks. Upon receiving a user utterance, the improved ASR model may query the trie-based deep biasing module to get a bias embedding, which may be then sent to both the transducer and the language model. The transducer may then calculate probabilities of likely words for the utterance based on the bias embedding and the audio frames. The language model may calculate probabilities of likely words for the utterance based on the bias embedding and the previous token of the utterance. A decoder may be further used to make the final decision of the most-likely word of the utterance. Although this disclosure describes predicting particular vocabularies by particular models in a particular manner, this disclosure contemplates predicting any suitable vocabulary by any suitable model in any suitable manner.

In particular embodiments, the computing system may receive an utterance spoken by a user. The utterance may comprise a word in a custom vocabulary list of the user. The computing system may then generate a previous token to represent a previous audio portion of the utterance. In particular embodiments, the computing system may generate a current token to represent a current audio portion of the utterance by the following steps. The computing system may first generate a bias embedding by using the previous token to query a trie of wordpieces representing the custom vocabulary list. The assistant system may then generate, based on the bias embedding and the current audio portion, first probabilities of respective first candidate tokens likely uttered in the current audio portion. The computing system may then generate, based on the previous token and the bias embedding, second probabilities of respective second candidate tokens likely uttered after the previous token. The computing system may further generate, based on the first probabilities of the first candidate tokens and the second probabilities of the second candidate tokens, the current token to represent the current audio portion of the utterance.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a computing system may use an improved automatic speech recognition (ASR) model for more accurate prediction of custom vocabularies at runtime by integrating shallow fusion, trie-based deep biasing, and neural network language model contextualization. The improved ASR model may generalize well to different scenarios without the need to be trained for every user. The improved ASR model may be based on three components, i.e., a trie-based deep biasing module, a transducer, and a language model. In particular, the trie-based deep biasing module may be based on a prefix trie that may be built from a list of custom vocabularies associated with a user, which may be personal to that user. The transducer and the language model may be based on neural networks. Upon receiving a user utterance, the improved ASR model may query the trie-based deep biasing module to get a bias embedding, which may be then sent to both the transducer and the language model. The transducer may then calculate probabilities of likely words for the utterance based on the bias embedding and the audio frames. The language model may calculate probabilities of likely words for the utterance based on the bias embedding and the previous token of the utterance. A decoder may be further used to make the final decision of the most-likely word of the utterance. Although this disclosure describes predicting particular vocabularies by particular models in a particular manner, this disclosure contemplates predicting any suitable vocabulary by any suitable model in any suitable manner.

In particular embodiments, the computing system may receive an utterance spoken by a user. The utterance may comprise a word in a custom vocabulary list of the user. The computing system may then generate a previous token to represent a previous audio portion of the utterance. In particular embodiments, the computing system may generate a current token to represent a current audio portion of the utterance by the following steps. The computing system may first generate a bias embedding by using the previous token to query a trie of wordpieces representing the custom vocabulary list. The assistant system may then generate, based on the bias embedding and the current audio portion, first probabilities of respective first candidate tokens likely uttered in the current audio portion. The computing system may then generate, based on the previous token and the bias embedding, second probabilities of respective second candidate tokens likely uttered after the previous token. The computing system may further generate, based on the first probabilities of the first candidate tokens and the second probabilities of the second candidate tokens, the current token to represent the current audio portion of the utterance.

How to leverage dynamic contextual information in end-to-end speech recognition has remained an active research area. Previous solutions to this problem were either designed for specialized use cases that may not generalize well to open-domain scenarios, may not scale to large biasing lists, or may underperform on rare long-tail words. The embodiments disclosed herein address these limitations by a solution that may combine shallow fusion, trie-based deep biasing, and neural network language model contextualization. These techniques result in significant 19.5% relative word error rate (WER) improvement over existing contextual biasing approaches and 5.4%-9.3% improvement compared to a strong hybrid baseline on both open-domain and constrained contextualization tasks, where the targets consist of mostly rare long-tail words. The embodiment disclosed herein present a system that may remain lightweight and modular, allowing for quick modification without model re-training.

End-to-end automatic speech recognition (ASR) models have become increasingly popular in recent years, thanks to their simplicity and competitive performance on generic transcription tasks. Meanwhile, traditional hybrid systems based on hidden Markov model and deep neural network (HMM-DNN) still remain attractive in practice due to their modularity and flexibility. Specifically, the stand-alone language model (LM) may allow for easy integration of external knowledge sources, such as unpaired text data and contextual biasing information.

Much of the past research in end-to-end ASR has focused on methods to inject external knowledge into the system. For static knowledge (i.e., knowledge that does not change from one utterance to the next), various LM fusion techniques have been proposed, in addition to methods that remove the internal LM's contribution prior to fusion. For dynamic knowledge (i.e., utterance-specific contextual information), possible solutions include shallow fusion with class-based weighted finite state transducer (WFST), attention-based deep context, and trie-based deep biasing. The shallow fusion-based solutions may rely on strong context prefixes (e.g., call, play, message) to increase precision and avoid over-biasing. While effective for the targeted tasks, this method may not generalize well to open-domain use cases where such prefixes are not available. On the other hand, deep biasing solutions that inject contextual information directly into the network may be not reliant on context prefixes or known patterns, but may not work well when the biasing list gets larger and tend to underperform on rare words. How to develop an end-to-end ASR system that can handle large biasing lists of rare words in an open-domain scenario remains a challenge.

The embodiments disclosed herein tackle this problem by a solution that may combine WFST shallow fusion, trie-based deep biasing, and neural network LM (NNLM) contextualization. Unlike conventional work which may rely on specialized WFSTs, the embodiments disclosed herein may use a generic WFST that may not require strong context prefixes nor domain-specific sentence patterns. Unlike conventional work which may contextualize the end-to-end ASR model, the embodiments disclosed herein may fuse the NNLM with trie-based deep biasing to give the former implicit access to biasing information and leverage the vast amount of unpaired text data. On LibriSpeech, the embodiments disclosed herein produce on average 34.5% relative word error rate (WER) improvement compared to the baseline and 19.5% compared to existing contextual biasing approaches. Finally, our experiments on large-scale in-house data validate the findings on LibriSpeech: the resulting end-to-end system improves significantly over the baseline as well as outperforms a strong hybrid setup by 5.4%-9.3% on both open-domain and constrained contextualization tasks, where the targets consist of mostly rare long-tail words. Our final system may remain lightweight and modular, allowing for quick modification without re-training the main ASR model.

The embodiments disclosed herein conduct the majority of our experiments on the widely used LibriSpeech dataset which consists of 960 hours of labeled audio for training and an additional 810M-word text corpus for LM building. In order to study contextualization performance, the embodiments disclosed herein construct an artificial biasing list for each test utterance as follows. Firstly, we fill the biasing list with all rare words in the reference, defined as words that fall outside the 5,000 most common words in the audio training set (which account for 90% of all word occurrences). Secondly, we add N={100, 500, 1000, 2000} distractors randomly sampled from the 209.2K rare words in the training vocabulary. In evaluation, the model may have access to both the audio as well as the associated biasing list. The embodiments disclosed herein track three different evaluation metrics, (1) WER: overall WER measured on all words, (2) UWER: unbiased WER measured on words not in the biasing list, and (3) B-WER: biased WER measured on words IN the biasing list. Insertion errors are counted toward B-WER if the inserted word is in the biasing list and U-WER otherwise. The biasing lists cover 5.8K out of 52.6K words in test-clean and 5.3K out of 52.3K words in test-other (i.e., 10.6% total word coverage). The goal of contextualization is to improve B-WER without degrading U-WER significantly.

The LibriSpeech corpus is a smaller than our in-house datasets. Moreover, each artificial biasing list has at least some overlap with the reference text, which may be not guaranteed in practice. The embodiments disclosed herein therefore conduct experiments on our in-house data to understand the system's performance on large-scale training sets and realistic evaluation data. The first part of our training corpus comprises 1.7M hours of English video data publicly shared by social-network users. All videos are completely de-identified before transcription. The second part comprises 50K hours of manually transcribed de-identified English data with no user-identifiable information (UII) in the voice assistant domain. All utterances are morphed when researchers manually access them to further de-identify the speaker. Note that the data are not morphed during training and evaluation.

The embodiments disclosed herein consider two evaluation sets, (1) Video: 14.0K manually transcribed de-identified English videos publicly shared by social-network users and (2) Assistant: 20.8K manually transcribed de-identified utterances collected from voice activity of volunteer participants interacting with the voice assistant. The participants consist of households that have consented to having their voice activity reviewed and analyzed. The biasing lists in Video comprise on average 11 words (standard deviation δ=188) extracted from each video's title and description, covering 30.0K out of 2.0M total reference words (i.e., 1.5% coverage). The biasing lists in Assistant comprise on average 876 (δ=491) contact names, covering 8.1K out of 60.6K total reference words excluding the wake word (i.e., 13.4% coverage). Video data reflect the open-domain use case where the biasing word may appear in any context, whereas Assistant data reflect the constrained use case where the biasing word appears mostly in limited context (by itself or after call). The embodiments disclosed herein also track WER, U-WER, and B-WER for each test set.

Figure 1:
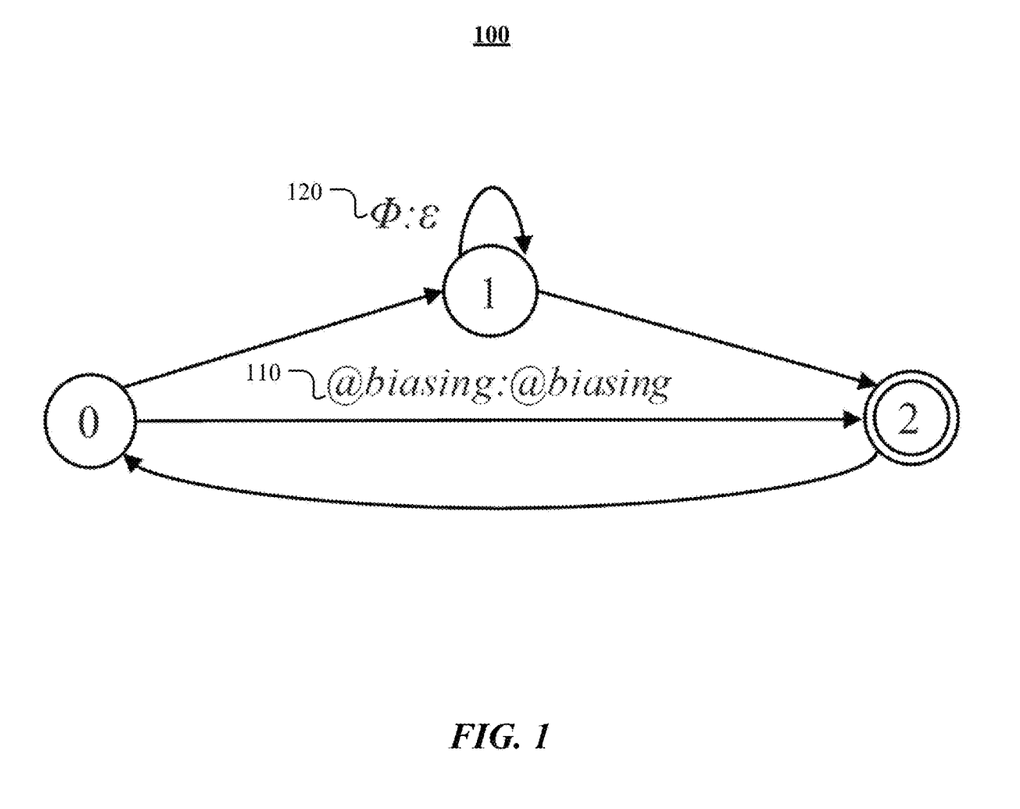
FIG. 1 illustrates an example generic WFST biasing.

FIG. 1 illustrates an example generic WFST biasing. WFST shallow fusion applied at the decoder level may be considered the standard contextualization method for end-to-end ASR. The embodiments disclosed herein may use a simple and generically applicable WFST, as shown in FIG. 1. @biasing 110 may be a dynamic class and <Φ120 may be a special label that may match any input symbol. In decoding, the @biasing WFST may be constructed dynamically from biasing data, followed by determinization, minimization, and epsilon removal. The embodiments disclosed herein may apply biasing at the wordpiece level and before the pruning stage of decoding. Note that the WFST shown in FIG. 1 may be easily modified to incorporate context prefixes (e.g., call, play, message) without losing its generalizability.

The trie-based biasing module may encode a list of biasing words as a non-trainable trie data structure over their wordpiece representation. In particular embodiments, the computing system may generate the trie based on the custom vocabulary list by encoding each word of the custom vocabulary list with one or more wordpieces and continuation relationship between the wordpieces. In particular embodiments, the trie may comprise a plurality of nodes and a plurality of directional edges connecting the nodes. The plurality of nodes may comprise a starting node and nodes corresponding to wordpieces associated with the custom vocabulary list. Each directional edge connecting two nodes corresponding to wordpieces may correspond to continuation relationship associated with the respective wordpieces. Given previously emitted wordpiece tokens as query, this biasing module may return a binary vector $h_{bias}=[h_{start}; h_{continue}] \in \{0, 1\}^{2D}$, where D is the wordpiece vocabulary size. In other words, the bias embedding may be associated with a dimension and the dimension may be determined based on a size of the custom vocabulary list. $h_{start} \in \{0, 1\}^D$ may assign a value of one to (i.e., activates) wordpieces that can start a new word in the biasing list, and zero to everything else. $h_{continue} \in \{0, 1\}^D$ may activate wordpieces that can continue an unfinished word in the biasing list. In short, $h_{bias}$ may represent all wordpieces that can continue traversing the trie given previously emitted tokens.

Figure 2:
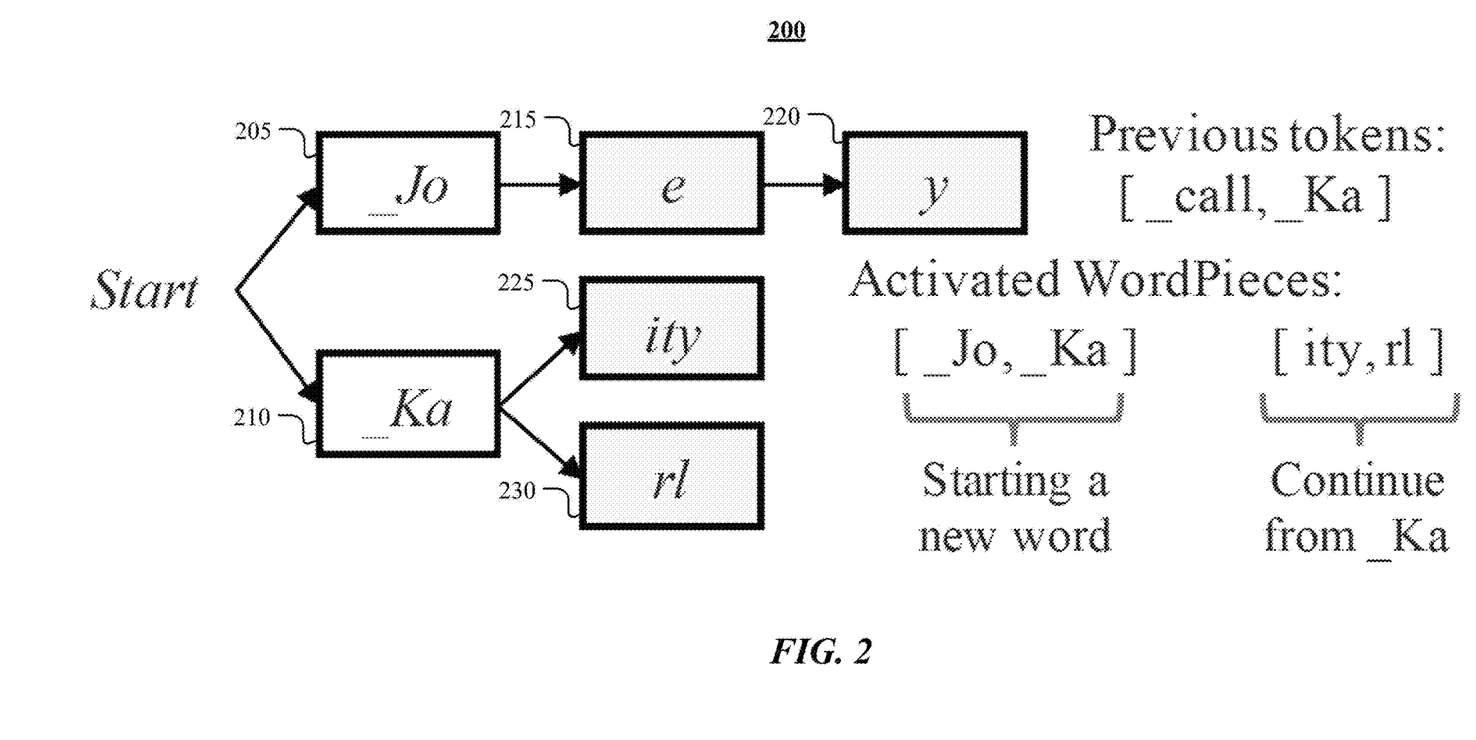
FIG. 2 illustrates an example trie and its query operation.

FIG. 2 illustrates an example trie 200 and its query operation. The example trie 200 is based on biasing words [Joe, Joey, Kaity, Karl]. The trie may comprise a plurality of cells, i.e., "Jo" 205, "Ka" 210, "e" 215, "y" 220, "ity" 225, "rl" 230. Cell 215, cell 220, cell 225, and cell 230 may indicate potential end-of-word symbols. In practice, the embodiments disclosed herein may implement the trie as a lookup table to minimize its overhead during training and decoding. Querying the trie may take O(1) time and building the trie may take O(N) time (negligible in practice), where N is the total number of wordpieces in the biasing list.

All of our end-to-end ASR models in the embodiments disclosed herein may be variants of sequence transducer, also known as recurrent neural network transducer (RNNT). A core limitation of vanilla RNNT in contextualization, even with WFST shallow fusion, may be that the model may not have access to any biasing information during inference. As a result, the RNNT output probabilities, especially for rare long-tail words, may be too small for decoder-side biasing to recover from. The motivation for integrating deep biasing with RNNT may be to address this limitation by giving the latter implicit access to biasing data during inference.

Figure 3:
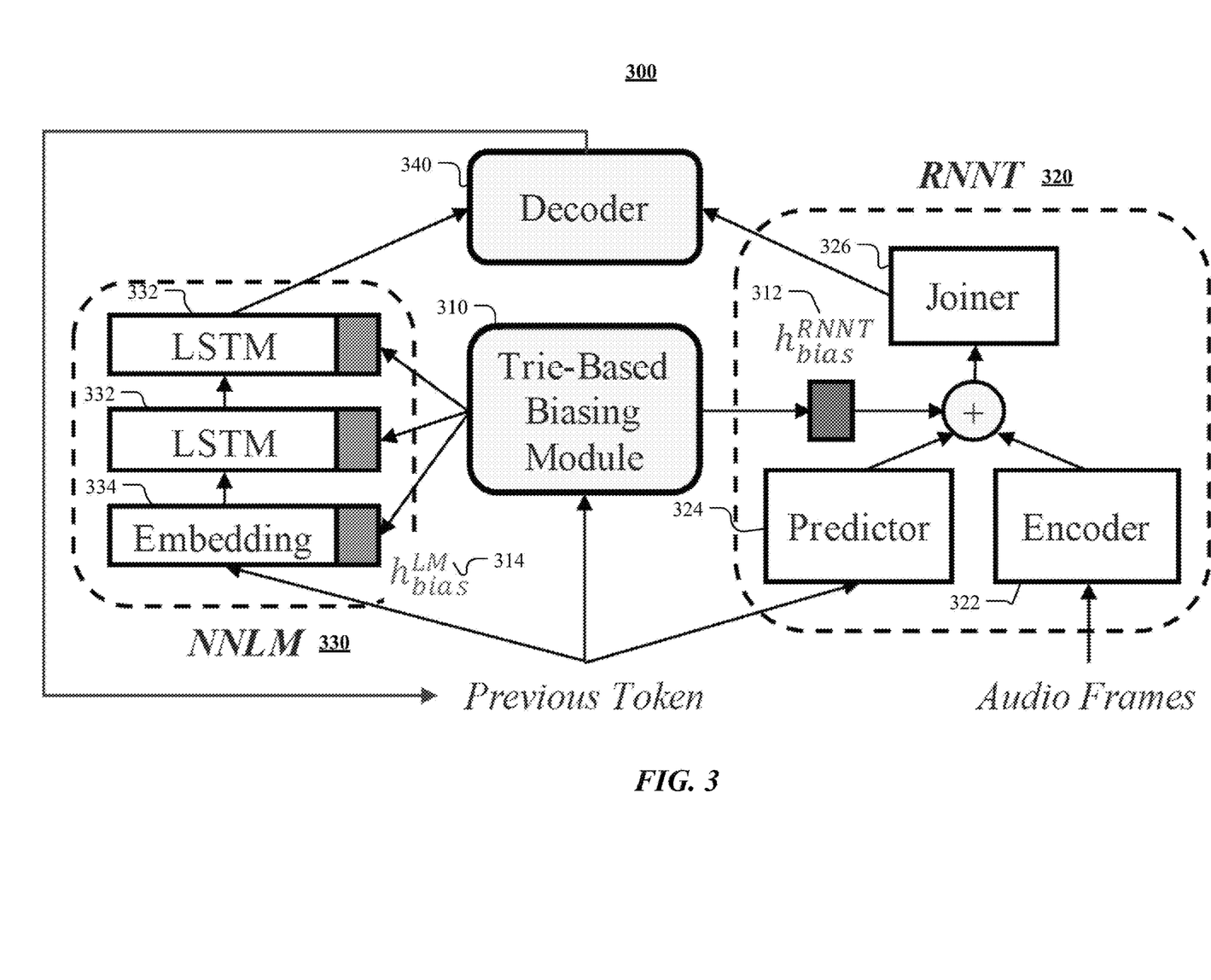
FIG. 3 illustrates an example architecture of the improved ASR model.

FIG. 3 illustrates an example architecture 300 of the improved ASR model. The architecture 300 may comprise a trie-based biasing module 310, an RNNT 320, an NNLM 330, and a decoder 340. In particular embodiments, generating the current token to represent the current audio portion of the utterance may be by the decoder 340. In particular embodiments, the first probabilities of respective first candidate tokens likely uttered in the current audio portion may be generated by a transducer model. As an example and not by way of limitation, the transducer model may be based on one or more neural networks (e.g., RNNT 320). The transducer model may comprise an encoder 322, a predictor 324, and a joiner 326. FIG. 3 shows how the trie-based biasing module 310 may interact with RNNT 320 and NNLM 330. In particular embodiments, the trie-based biasing module 310 and the decoder 340 may be non-trainable. In particular embodiments, the computing system may generate, by the encoder 322 based on the current audio portion, an encoder embedding. The computing system may also generate, by the predictor 324 based on the previous token, a predictor embedding. In particular embodiments, the computing system may integrate the bias embedding, the encoder embedding, and the predictor embedding by the joiner 326. Integrating the bias embedding, the encoder embedding, and the predictor embedding may comprise projecting the bias embedding, the encoder embedding, and the predictor embedding to a same dimension. As shown in the right side of FIG. 3, the output of the biasing module 310 may get projected to the same dimension $D^{emb}$ as the RNNT's 320 encoder 322 and predictor 324 embeddings, $h_{bias}^{RNNT} = f_{bias}^{RNNT}(h_{bias})$, with $f_{bias}^{RNNT}: \{0, 1\}^{2D} \to \mathbb{R}^{D^{emb}}$. The projected $h_{bias}^{RNNT}$ 312 may become an extra input to the joiner 326 and the parameters of $f_{bias}^{RNNT}$ bias may be trained jointly with the RNNT 320. The joiner's 326 job in this extended model may be to integrate information from all three lower level components, the encoder 322, predictor 324, and biasing module 310.

In particular embodiments, the second probabilities of respective second candidate tokens likely uttered after the previous token may be generated by a language model (e.g., NNLM 330). As an example and not by way of limitation, the language model may be based on one or more neural networks comprising one or more long-short term memory (LSTM) units. NNLM 330 may have a similar limitation as RNNT 320 in that without access to biasing information, the model 330 may not assign high enough probabilities for rare words to be recovered with only decoder-side biasing. The embodiments disclosed herein may integrate deep biasing with NNLM 330 as well to address this limitation.

In particular embodiments, the language model may comprise a plurality of hidden layers. Each of the plurality of hidden layers may have a respective input and a respective out. Generating the second probabilities of respective first candidate tokens likely uttered in the current audio portion may comprise the following steps. The computing system may first feed the previous token to the input of a first hidden layer of the plurality of hidden layers. The out of the first hidden layer may comprise an embedding for the previous token. The computing system may then generate a first concatenation by concatenating the output of the first hidden layer with the bias embedding. The computing system may then feed the first concatenation to the input of a second hidden layer of the plurality of hidden layers. The computing system may then generate a second concatenation by concatenating the output of the second hidden layer with the bias embedding. The computing system may then feed the second concatenation to the input of a third hidden layer of the plurality of hidden layers. The computing system may further concatenate the output of the third hidden layer with the bias embedding. As shown in the left side of FIG. 3, the output of the biasing module 310 may get projected to a smaller dimension $D^{lm}$, $h_{bias}^{lm} = f_{bias}^{LM}(h_{bias})$, with $f_{bias}^{LM}: \{0, 1\}^{2D} \to \mathbb{R}^{D^{lm}}$. NNLM 330 may comprise hidden layers such as the LSTM layer 332 and the embedding layer 334. The projected $h_{bias}^{lm}$ 314 may get concatenated with every hidden layer output in the NNLM 330 and the parameters of $f_{bias}^{LM}$ may be optimized together with NNLM 330 parameters. One advantage of fusing deep biasing with NNLM 330 compared to RNNT 320 may be that we can train the former on text-only data, which may be much easier to obtain and more plentiful than paired audio-text data. The embodiments disclosed herein train the NNLM 330 separately from RNNT 320, which may make the system more modular. Note that it may be possible to train both models jointly (e.g., with cold fusion).

The baseline streaming RNNT 320 architecture used in the embodiments disclosed herein has approximately 83M parameters in total. The encoder 322 may be a 20-layer streamable low-latency Emformer model with a stride of six, 60 ms lookahead, 300 ms segment size, 512-dimensional input, 2048-dimensional hidden size, eight self-attention heads, and 1024-dimensional fully-connected (FC) projection. The predictor 324 may comprise three long-short term memory (LSTM) layers with 512-dimensional hidden size, followed by 1024-dimensional FC projection. The joiner 326 may comprise one rectified linear unit (ReLU) and one FC layer. The target units may be 5000 unigram wordpieces trained with SentencePiece (i.e., a conventional work). The model may be trained for 100 epochs using sub-word regularization (l=5, $\alpha$=0.25) and ARRNNT loss with left buffer 0 and right buffer 15, where the alignment may be provided by a chenone hybrid acoustic model (AM). The embodiments disclosed herein utilize the auxiliary training tasks proposed in a conventional work to improve model performance and convergence, as well as speed perturbation and SpecAugment LD policy.

The baseline NNLM 330 may comprise five LSTM layers 332 with 2048-dimensional hidden size and 1024-dimensional internal projection, totaling approximately 105M parameters. The model may be trained on the 810M word text-only corpus for 40 epochs with Cross Entropy loss. This NNLM 330 may be shallow fused with the RNNT 320 after discounting internal LM scores.

For DB-RNNT and DB-NNLM training, the projection modules $f_{bias}^{RNNT}$ and $f_{bias}^{LM}$ may both comprise a single FC layer with output dimension 1024 and 256, respectively. The embodiments disclosed herein may construct an artificial biasing list for each training utterance on-the-fly, where the number of distractors may range from 400 to 800 (uniformly sampled). To prevent the model from overfitting to the biasing module's 310 output, the embodiments disclosed herein zero out the entire $h_{bias}$ 312 binary vector with 10% probability and remove each target reference word from the biasing list with 40% probability. DB-RNNT and DB-NNLM may follow the same training strategy as the baseline RNNT and NNLM without deep biasing.

In particular embodiments, the training of DB-RNNT and DB-NNLM may be based on training data from different surfaces, e.g., smart tablets, smart glasses, VR headsets, etc. In addition, we may create synthetic training data such as fake friends' names. To avoid making the trie-based biasing module 310 too powerful to dominate the prediction of the most-likely words, we may use some techniques such as removing certain vocabularies or random drop-out of certain vocabularies.

Our experiments on in-house data employ similar model architectures and training strategies described above with several differences. Firstly, the DB-RNNT may follow a two-stage training process, where the joiner parameters may be reset before finetuning the entire model with a lower learning rate. This may help reduce experiment turnaround time given the large amount of training data. Secondly, unlike LibriSpeech where the text-only corpus is significantly larger than the paired audiotext data (approximately 86 times the number of words), our in-house NNLM training corpus is only 20% larger than the paired audio-text portion. This may reduce the potential WER improvement from NNLM and DB-NNLM. Thirdly, the embodiments disclosed herein may utilize text-to-speech driven pronunciation learning for graphemic hybrid ASR during training and decoding to generate graphemic pronunciation variants for biasing words, which has been shown to improve rare word recognition significantly.

Figure 4:
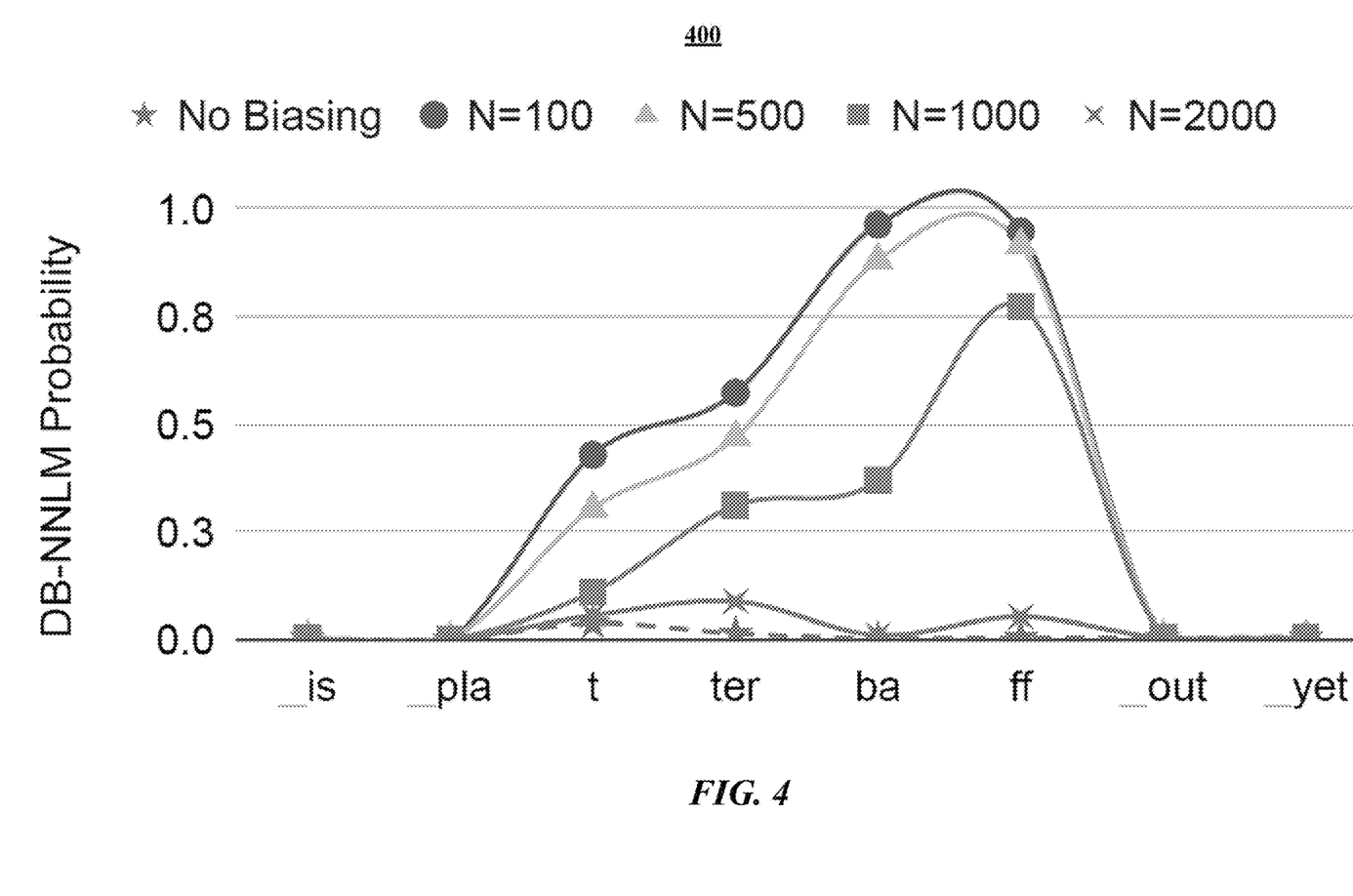
FIG. 4 illustrates example LibriSpeech DB-NNLM probability with different biasing list size N.

As shown in Table 1, all the biasing techniques in the embodiments disclosed herein may incur minimal degradation on U-WER, thus the embodiments disclosed herein focus exclusively on B-WER in the analysis. The first section of the table shows the results without NNLM. The embodiments disclosed herein found that WFST shallow fusion performs better than DB-RNNT by itself (i.e., S2 versus S1). DB-RNNT may be also sensitive to the size of the biasing list, where the B-WER improvement compared to the baseline B1 gets progressively smaller as the biasing list gets larger. WFST shallow fusion may exhibit a similar FIG. 4 illustrates example LibriSpeech DB-NNLM probability with different biasing list size N. DB-NNLM may have a similar weakness as DB-RNNT in that it may not work as well with biasing lists that are much larger than what is seen during training. FIG. 4 illustrates this phenomenon, where the NNLM assigns a relatively low probability to the rare word "platterbaff" (one of the biasing words) without biasing. With "platterbaff" in the biasing list, however, its probability may become much higher and reduce to the non-biased probability as the biasing list gets larger. One notable observation may comprise that the DB-NNLM's probability for "platterbaff" is low for the first wordpiece, but gets gradually higher within the word. The embodiments disclosed herein observe the same trend with DB-RNNT's internal LM. By contrast, the WFST boosting weight may be constant for every wordpiece in the biasing word. This may suggest that: (1) the low initial probability may explain why trie-based deep biasing by itself underperforms compared to WFST shallow fusion, and (2) there may be a better way to combine the two techniques by taking advantage of the score patterns

TABLE 1

LibriSpeech results with different biasing list size N. Reported metrics are in the following format: WER (U-WER/B-WER).

| | N = 100 | | N = 500 | | N = 1000 | | N = 2000 | |
|---|---|---|---|---|---|---|---|---|
| Model | test-clean | test-other | test-clean | test-other | test-clean | test-other | test-clean | test-other |
| B1: RNNT Baseline | 3.65 (2.4/14.1) | 9.61 (7.2/30.6) | 3.65 (2.4/14.1) | 9.61 (7.2/30.6) | 3.65 (2.4/14.1) | 9.61 (7.2/30.6) | 3.65 (2.4/14.1) | 9.61 (7.2/30.6) |
| S1: B1 + DSB-RRNT | 3.11 (2.3/9.8) | 8.79 (7.1/23.4) | 3.24 (2.3/10.7) | 9.03 (7.2/25.1) | 3.30 (2.4/11.0) | 9.12 (7.2/26.1) | 3.34 (2.3/11.4) | 9.28 (7.3/27.0) |
| S2: B1 + WFST | 3.06 (2.3/9.8) | 8.60 (7.1/22.2) | 3.10 (2.3/9.6) | 8.72 (7.1/22.5) | 3.11 (2.3/9.7) | 8.78 (7.2/22.8) | 3.09 (2.3/9.6) | 8.83 (7.2/22.9) |
| S3: B1 + NNLM | 2.81 (2.2/7.4) | 8.10 (7.0/17.7) | 2.91 (2.3/8.1) | 8.30 (7.1/19.1) | 3.00 (2.3/8.5) | 8.45 (7.1/20.5) | 3.04 (2.3/8.9) | 8.75 (7.3/21.8) |
| B2: B1 + NNLM | 2.79 (1.7/11.6) | 7.35 (5.2/26.3) | 2.79 (1.7/11.6) | 7.35 (5.2/26.3) | 2.79 (1.7/11.6) | 7.35 (5.2/26.3) | 2.79 (1.7/11.6) | 7.35 (5.2/26.3) |
| S4: S3 + NNLM | 2.28 (1.6/7.9) | 6.50 (5.1/18.7) | 2.35 (1.6/8.2) | 6.64 (5.2/19.6) | 2.40 (1.7/8.4) | 6.72 (5.2/20.2) | 2.41 (1.7/8.6) | 6.81 (5.2/20.9) |
| S5: S3 + DB-NNLM | 1.98 (1.5/5.7) | 5.86 (4.9/14.1) | 2.09 (1.6/6.2) | 6.09 (5.1/15.1) | 2.14 (1.6/6.7) | 6.35 (5.1/17.2) | 2.27 (1.6/7.3) | 6.58 (5.2/18.9) | trend but to a much lesser extent. This behavior may be due to how the DB-RNNT is trained, where we sample between 400-800 distractors for each training iteration. As a result, the model may not generalize well to much larger biasing lists. The embodiments disclosed herein found that sampling more distractors during training may improve B-WER on larger biasing lists, but degrade B-WER on smaller biasing lists. This may suggest that the number of distractors sampled during training should be based on the expected biasing list size in testing. Combining DB-RNNT and WFST leads to significant 13.4% relative improvement in BWER over the best standalone technique and 38.5% over the RNNT baseline B1, averaged over all test sets and biasing lists.

The second section of Table 1 shows the results after incorporating NNLM shallow fusion. The embodiments disclosed herein observe significant WER improvement over the baseline without NNLM. However, comparing S4 and S3, the impact of NNLM on B-WER may be overall neutral since the model may not have access to any biasing information. By replacing NNLM with DB NNLM (S5), we may improve B-WER significantly as well, with an average relative improvement of 19.5% over S3 and 34.5% over the RNNT+NNLM baseline B2.

TABLE 2

In-house results.
Metrics: WER (U-WER/B-WER).

| Model | Video | Assistant |
|---|---|---|
| B0: Hybrid Baseline (with biasing) | 16.75 (17.3/16.6) | 10.07 (9.7/12.9) |
| B1: RNNT Baseline (with biasing) | 16.08 (16.5/27.2) | 14.36 (9.1/48.3) |
| S1: B1 + DB-RNNT | 16.02 (16.5/22.1) | 12.41 (9.1/33.6) |
| S2: WFST | 16.01 (16.6/19.8) | 9.29 (8.8/12.8) |
| S3: DB-RNNT | 16.00 (16.6/16.8) | 9.25 (8.9/11.8) |
| S4: NNLM | 15.59 (16.2/16.7) | 9.16 (8.8/11.7) |
| S5: S3 + Db-NNLM | 15.8 (16.2/15.7) | 9.16 (8.8/11.7) |

Table 2 summarizes the results on our large-scale in-house data. Overall, the embodiments disclosed herein observe a similar trend as on LibriSpeech, where our final system S5 significantly improves B-WER by 42.3%-75.8% with minimal U-WER degradation, compared to the RNNT baseline B1. Our system also achieves 5.4%-9.3% improvement on both U-WER and B-WER over the strong hybrid baseline B0 which utilizes chenone-based Emformer AM with similar size as the RNNT encoder, 4-gram class-based LM for first pass decoding and contextual biasing, and NNLM for second pass rescoring, while being much more lightweight in physical size (200 MB versus 4 GB, both with 8-bit quantization). These results confirm that the techniques in the embodiments disclosed herein may generalize well to large-scale training sets and realistic evaluation data.

At the same time, there are several differences compared to LibriSpeech results. Firstly, the impact of DB-RNNT and DB-NNLM is larger on Video than on Assistant, most likely because the former has smaller biasing lists which may be beneficial for trie-based deep biasing. Secondly, the incremental improvement from DB-NNLM in both sets is much smaller than that in LibriSpeech. Our NNLM training data may be not vastly larger than the paired audio-text data used for RNNT training, which could explain the smaller improvement. This may suggest that DB-NNLM is more applicable when we have limited labeled audio relative to text-only data.

In particular embodiments, the improved ASR model may be useful in a variety of use cases, especially for things the model has never seen before in training, e.g., restaurants names, etc. As an example and not by way of limitation, the improved ASR model may be used by users who are in a call on a smart tablet. As another example and not by way of limitation, there may be AR effects on the screen and the user may dictate AR effect names to a system, for which the system may recognize the dictated AR effect names better using the improved ASR model.

Figure 5:
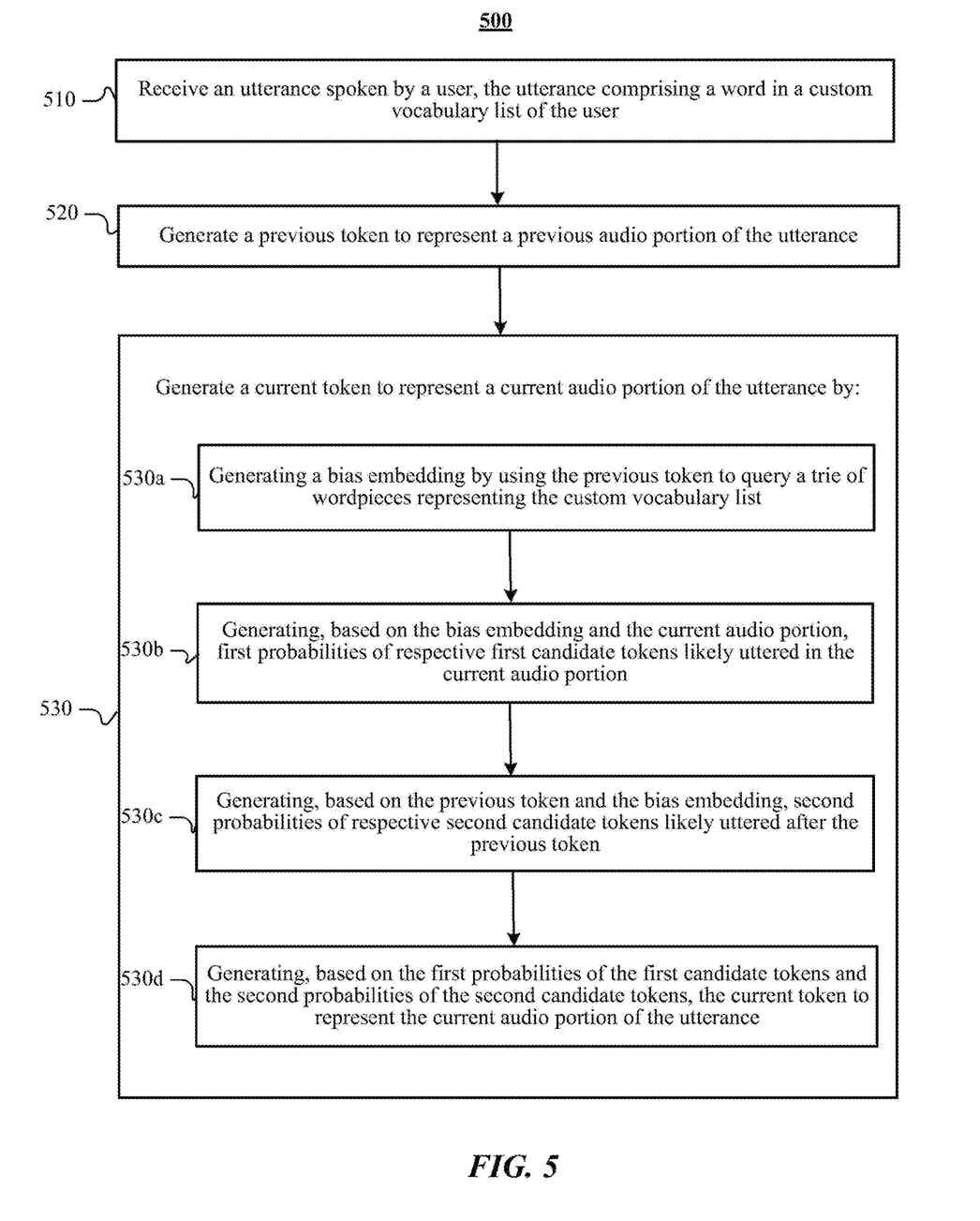
FIG. 5 illustrates an example method for predicting a current token of an utterance.

FIG. 5 illustrates an example method 500 for predicting a current token of an utterance. The method may begin at step 510, where the computing system may receive an utterance spoken by a user, the utterance comprising a word in a custom vocabulary list of the user. At step 520, the computing system may generate a previous token to represent a previous audio portion of the utterance. At step 530, the computing system may Generate a current token to represent a current audio portion of the utterance by the following sub-steps. At sub-step 530a, the computing system may generate a bias embedding by using the previous token to query a trie of wordpieces representing the custom vocabulary list. At sub-step 530b, the computing system may generate, based on the bias embedding and the current audio portion, first probabilities of respective first candidate tokens likely uttered in the current audio portion. At sub-step 530c, the computing system may generate, based on the previous token and the bias embedding, second probabilities of respective second candidate tokens likely uttered after the previous token. At sub-step 530d, the computing system may generate, based on the first probabilities of the first candidate tokens and the second probabilities of the second candidate tokens, the current token to represent the current audio portion of the utterance. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for predicting a current token of an utterance including the particular steps of the method of FIG. 5, this disclosure contemplates any suitable method for predicting a current token of an utterance including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
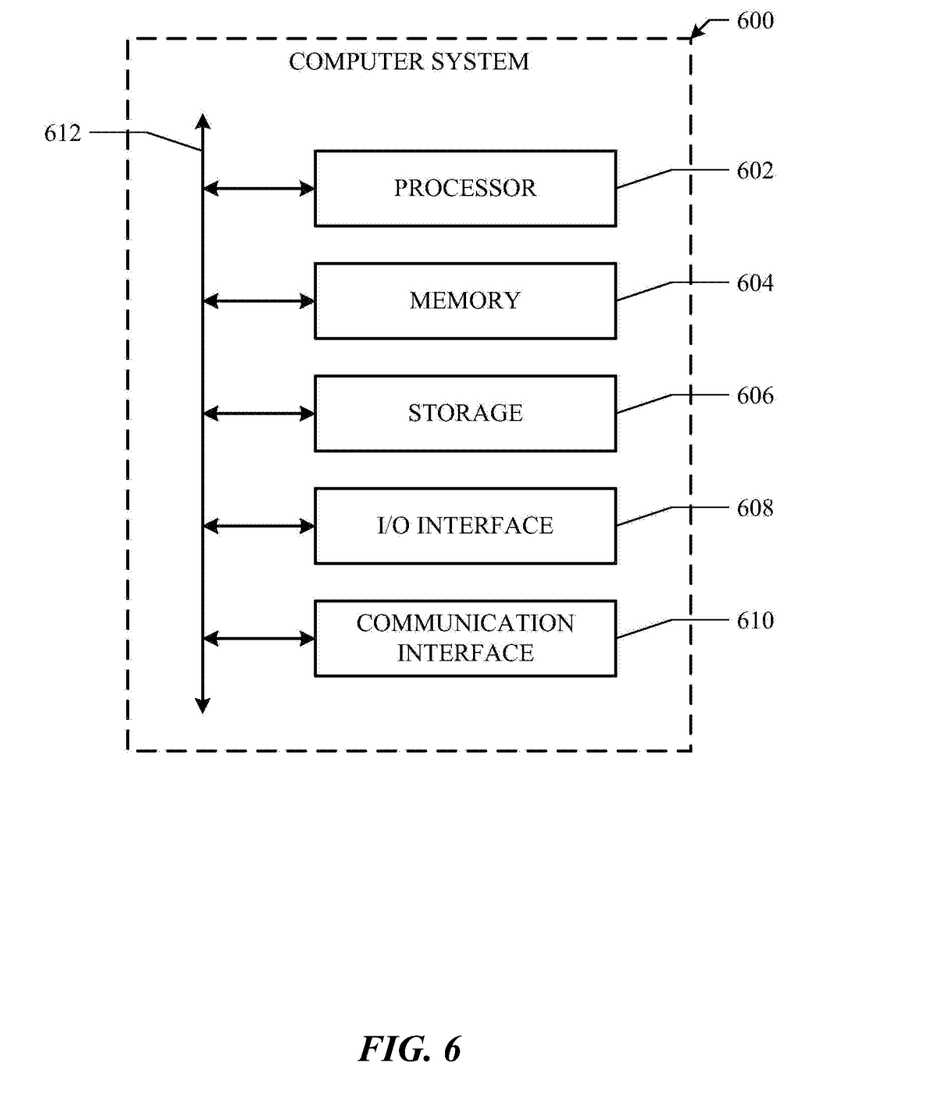
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
receiving an utterance spoken by a user, the utterance comprising a word in a custom vocabulary list of the user;
generating a previous token to represent a previous audio portion of the utterance; and
generating a current token to represent a current audio portion of the utterance by:
generating a bias embedding by using the previous token to query a trie of wordpieces representing the custom vocabulary list, wherein the trie is based on biasing words;
generating, based on the bias embedding and the current audio portion, first probabilities of respective first candidate tokens likely uttered in the current audio portion;
generating, based on the previous token and the bias embedding, second probabilities of respective second candidate tokens likely uttered after the previous token; and
generating, based on the first probabilities of the respective first candidate tokens and the second probabilities of the respective second candidate tokens, the current token to represent the current audio portion of the utterance.

2. The method of claim 1, wherein the trie comprises a plurality of nodes and a plurality of directional edges connecting the nodes, wherein the plurality of nodes comprise a starting node and nodes corresponding to wordpieces associated with the custom vocabulary list, and wherein the plurality of directional edges connecting two nodes corresponding to the wordpieces corresponds to a continuation relationship associated with the wordpieces.

3. The method of claim 1, further comprising:
generating the trie based on the custom vocabulary list by encoding the words of the custom vocabulary list with one or more wordpieces and a continuation relationship between the wordpieces.

4. The method of claim 1, wherein the bias embedding is associated with a dimension, and wherein the dimension is determined based on a size of the custom vocabulary list.

5. The method of claim 1, wherein the first probabilities of the respective first candidate tokens likely uttered in the current audio portion are generated by a transducer model, and wherein the transducer model comprises an encoder, a predictor, and a joiner.

6. The method of claim 5, wherein the transducer model is based on one or more neural networks.

7. The method of claim 5, wherein generating the first probabilities of the respective first candidate tokens likely uttered in the current audio portion comprises:
generating, by the encoder based on the current audio portion, an encoder embedding;
generating, by the predictor based on the previous token, a predictor embedding;
integrating the bias embedding, the encoder embedding, and the predictor embedding by the joiner.

8. The method of claim 7, wherein the integrating the bias embedding, the encoder embedding, and the predictor embedding comprises projecting the bias embedding, the encoder embedding, and the predictor embedding to a same dimension.

9. The method of claim 1, wherein the second probabilities of the respective second candidate tokens likely uttered after the previous token are generated by a language model, wherein the language model is based on one or more neural networks comprising one or more long-short term memory (LSTM) units.

10. The method of claim 9, wherein the language model comprises a plurality of hidden layers, the plurality of hidden layers having a respective input and a respective output, and wherein generating the second probabilities of the respective first candidate tokens likely uttered in the current audio portion comprises:
feeding the previous token to an input of a first hidden layer of the plurality of hidden layers, wherein an output of the first hidden layer comprises an embedding associated with the previous token;
generating a first concatenation by concatenating the output of the first hidden layer with the bias embedding;
feeding the first concatenation to an input of a second hidden layer of the plurality of hidden layers;
generating a second concatenation by concatenating an output of the second hidden layer with the bias embedding;
feeding the second concatenation to an input of a third hidden layer of the plurality of hidden layers; and
concatenating an output of the third hidden layer with the bias embedding.

11. The method of claim 1, wherein generating the current token to represent the current audio portion of the utterance is by a decoder.

12. One or more computer-readable non-transitory storage media embodying software that is operable when executed to:
receive an utterance spoken by a user, the utterance comprising a word in a custom vocabulary list of the user;
generate a previous token to represent a previous audio portion of the utterance; and
generate a current token to represent a current audio portion of the utterance by:
generating a bias embedding by using the previous token to query a trie of wordpieces representing the custom vocabulary list, wherein the trie is based on biasing words;
generating, based on the bias embedding and the current audio portion, first probabilities of respective first candidate tokens likely uttered in the current audio portion;
generating, based on the previous token and the bias embedding, second probabilities of respective second candidate tokens likely uttered after the previous token; and
generating, based on the first probabilities of the respective first candidate tokens and the second probabilities of the respective second candidate tokens, the current token to represent the current audio portion of the utterance.

13. The media of claim 12, wherein the trie comprises a plurality of nodes and a plurality of directional edges connecting the nodes, wherein the plurality of nodes comprise a starting node and nodes corresponding to wordpieces associated with the custom vocabulary list, and wherein the plurality of directional edges connecting two nodes corresponding to the wordpieces corresponds to a continuation relationship associated with the wordpieces.

14. The media of claim 12, wherein the software is further operable when executed to:
generate the trie based on the custom vocabulary list by encoding the words of the custom vocabulary list with one or more wordpieces and a continuation relationship between the wordpieces.

15. The media of claim 12, wherein the first probabilities of the respective first candidate tokens likely uttered in the current audio portion are generated by a transducer model, and wherein the transducer model comprises an encoder, a predictor, and a joiner.

16. The media of claim 15, wherein generating the first probabilities of the respective first candidate tokens likely uttered in the current audio portion comprises:
generating, by the encoder based on the current audio portion, an encoder embedding;
generating, by the predictor based on the previous token, a predictor embedding; and
integrating the bias embedding, the encoder embedding, and the predictor embedding by the joiner.

17. A system comprising: one or more processors; and a non-transitory memory coupled to the processors comprising instructions executable by the one or more processors, the one or more processors operable when executing the instructions to:
receive an utterance spoken by a user, the utterance comprising a word in a custom vocabulary list of the user;
generate a previous token to represent a previous audio portion of the utterance; and
generate a current token to represent a current audio portion of the utterance by:
generating a bias embedding by using the previous token to query a trie of wordpieces representing the custom vocabulary list, wherein the trie is based on biasing words;
generating, based on the bias embedding and the current audio portion, first probabilities of respective first candidate tokens likely uttered in the current audio portion;
generating, based on the previous token and the bias embedding, second probabilities of respective second candidate tokens likely uttered after the previous token; and
generating, based on the first probabilities of the respective first candidate tokens and the second probabilities of the respective second candidate tokens, the current token to represent the current audio portion of the utterance.

18. The system of claim 17, wherein the trie comprises a plurality of nodes and a plurality of directional edges connecting the nodes, wherein the plurality of nodes comprise a starting node and nodes corresponding to wordpieces associated with the custom vocabulary list, and wherein the plurality of directional edges connecting two nodes corresponding to the wordpieces corresponds to a continuation relationship associated with the wordpieces.

19. The system of claim 17, wherein the one or more processors are further operable when executing the instructions to:
generate the trie based on the custom vocabulary list by encoding the words of the custom vocabulary list with one or more wordpieces and a continuation relationship between the wordpieces.

20. The system of claim 17, wherein the first probabilities of the respective first candidate tokens likely uttered in the current audio portion are generated by a transducer model, and wherein the transducer model comprises an encoder, a predictor, and a joiner.

\* \* \* \* \*